Figure 2:
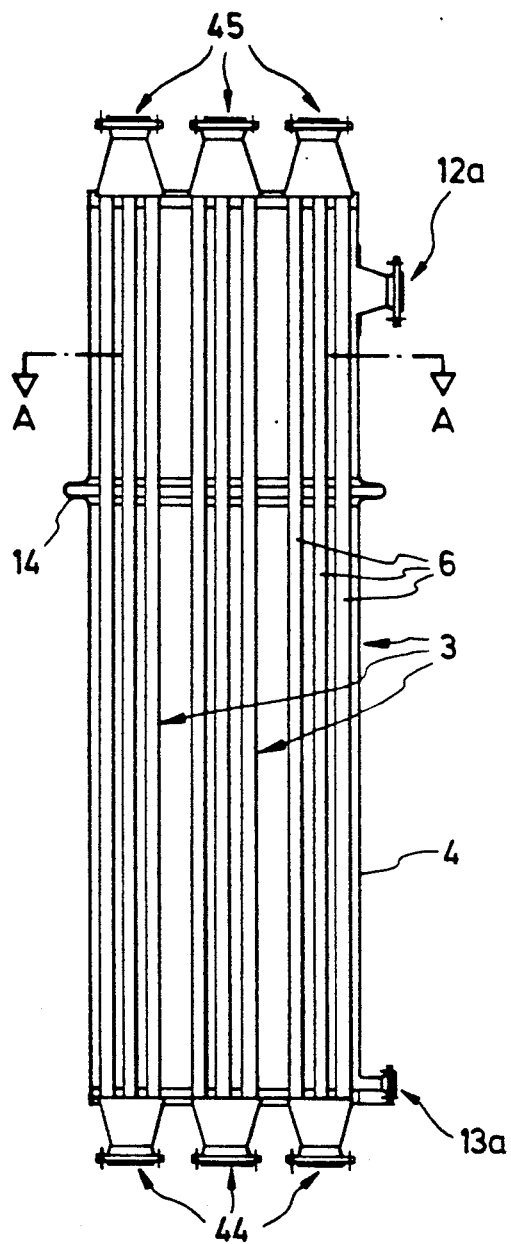

United States Patent [19]
Brauer et al.

[11] Patent Number: 5,168,920
[45] Date of Patent: Dec. 8, 1992

[54] WORT BOILER APPARATUS WITH EXTERNAL BOILER

[75] Inventors: Heinz Brauer, Freising; Martin Widhopf, Pulling, both of Fed. Rep. of Germany

[73] Assignee: Anton Steinecker Entwicklungs GmbH & Co., Freising, Fed. Rep. of Germany

[21] Appl. No.: 714,883

[22] Filed: Jun. 13, 1991

[51] Int. Cl.$^5$ .............................................. F29F 27/00
[52] U.S. Cl. .................................. 165/100; 165/101; 165/108; 99/278
[58] Field of Search ........................ 165/100, 101, 108; 99/278

[56] References Cited

U.S. PATENT DOCUMENTS 4,552,060 11/1985 Redl et al. .............................. 99/278
4,813,346 3/1989 Widhopf .............................. 99/278

FOREIGN PATENT DOCUMENTS 1233419 2/1967 Fed. Rep. of Germany ...... 165/100

Primary Examiner—Albert W. Davis, Jr.
Attorney, Agent, or Firm—Seed and Berry

[57] ABSTRACT

The invention relates to a wort boiler apparatus comprising a wort boiler vessel and at least one separate heating circuit external of the boiler vessel and including a heat exchanger for heating or boiling the wort, the heat exchanger comprising an arrangement of heat exchanger pipes for passing the wort through the heat exchanger. The object of the invention is to provide a heat exchanger adapted to be adjusted to different evaporation values as required for making different types of beer. To attain this object, the invention provides that the arrangement of heat exchanger pipes includes pipe connections and valves in an arrangement permitting the wort to be passed through the heat exchanger along flowpaths of different lengths.

6 Claims, 3 Drawing Sheets

WORT BOILER APPARATUS WITH EXTERNAL BOILER

The invention relates to a wort boiler apparatus comprising a wort boiler and at least one separate heater circuit external of said wort boiler and including a heat exchanger for heating or/and boiling the wort, the heat exchanger comprising a group of heat exchanger pipes for the passage of the wort through the heat exchanger.

In the beer brewing industry, the wort boiling operation mainly serves the purpose of evaporating an excess of water to thereby obtain a desired concentration of the wort. In addition, the wort boiling operation essentially serves the purposes of destroying enzymes, sterilizing the wort, substantially complete elimination of coagulatable proteins, and promoting the dissolution in the wort of the important hop components, mainly of the hop's bitter constituents.

The wort boiling operation is carried out by selectively employing internal and/or external boilers. Internal boilers are disposed directly within the wort boiler vessel, while external boilers comprise heat exchangers provided in a heater circuit externally of the wort boiler vessel. A wort boiler apparatus with an external boiler of the type described above is known from DE 34 30 798 A1.

Depending on the type of beer to be made, the wort boiling operation has to be carried out to achieve different output percentages, i.e. different evaporation values. The employ of external boilers of prior art design offers only reduced possibilities for achieving different evaporation values. Inasmuch as the flow speed of the wort through the heat exchanger has to be kept at a constant rate of about 2 to 2.5 m/sec, the evaporation value can scarcely be varied by varying the circulation speed. The variation of the evaporation value by varying the temperature within the heat exchanger is likewise only possible to a limited degree, because the temperature of the wort may only be varied within a restricted range for technological reasons.

Known from DE-GM 19 68 118 is an installation for making beer, in which two series-connected heat exchangers are connected to a wort-containing vessel, and adapted by means of a valve and a connecting pipe to be interconnected in such a manner that only one of the two heat exchangers is in operation, or both heat exchangers are used in series. In this particular beer-making method known from the cited publication, in which the wort container is provided with an opening for the introduction of hops, the heat exchangers connected to the wort container are intended to perform the function of the actual brewing boiler.

It is an object of the invention to provide a wort boiler apparatus of the type defined in the introduction, which may be used for boiling the wort for different types of beer, and offers in particular the possiblity of carrying out the wort-boiling operation with variable evaporation values.

According to the invention, this object is attained by the provision that the heat exchanger comprises at least one heat exchange section composed of a plurality of heat exchanger pipes and having a wort inlet and a wort oulet, said heat exchange section being provided with pipe connections and valves arranged to permit the wort to flow through the heat exchange section along flowpaths of different length, each said flowpath including all of the heat exchanger pipes.

This solution according to the invention permits the wort to be subjected to the heating operation for a variable length of time at substantially constant flow rate through the heat exchanger and approximately constant heating temperature, to thereby vary the evaporation volume. The provision of wort flow paths of variable lengths permits the apparatus to be used for boiling the wort for different types of beer.

In a preferred embodiment of the invention, the heat exchanger pipes are adapted to be interconnected in series or in parallel for the formation of flow paths of different lengths.

Also according to a preferred embodiment of the invention, each heat exchange section comprises nine heat exchanger pipes, the ends of the heat exchanger pipes being provided with pipe connections and valves arranged in a manner permitting the nine heat exchanger pipes to be interconnected in series for the formation of a flowpath of a first length, or in a series connection of groups of three pipes each for the formation of a flowpath of a second length, this second length thus amounting to only about one-third of the first flowpath length.

Further advantageous embodiments of the invention will become evident from the subclaims.

Figure 1:
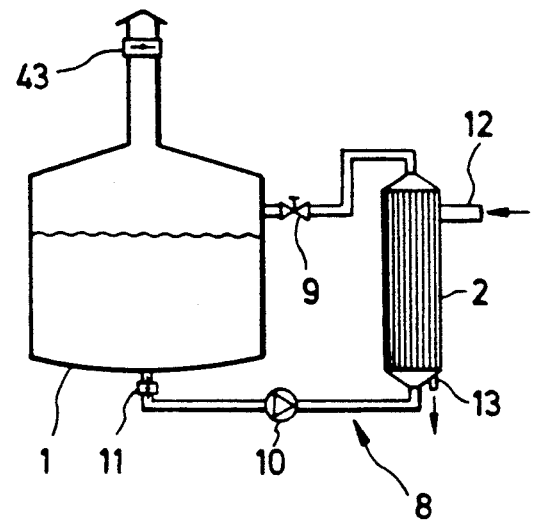
Figure 3:
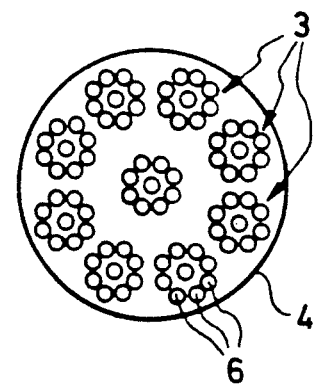
Figure 4:
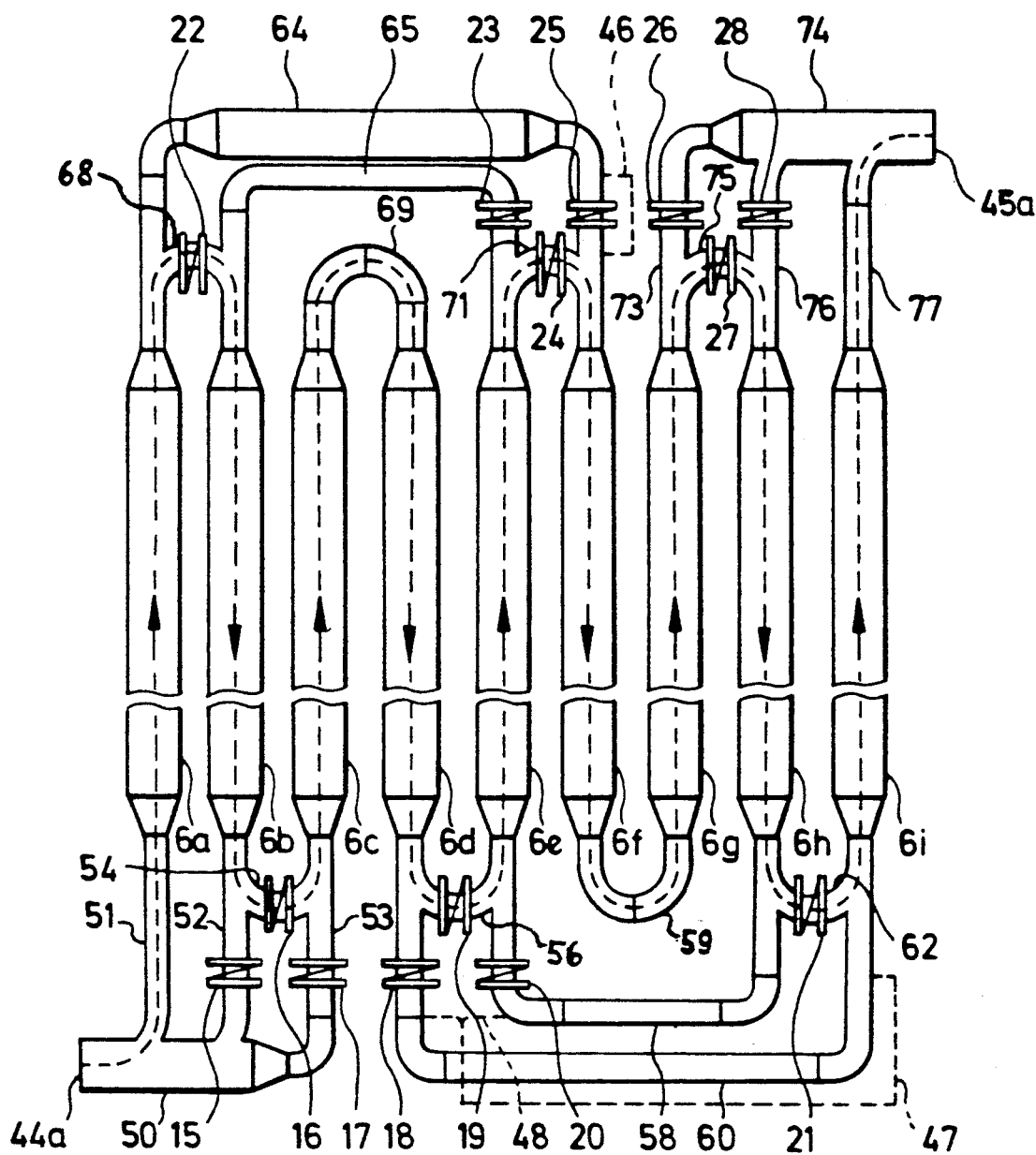
Figure 5:
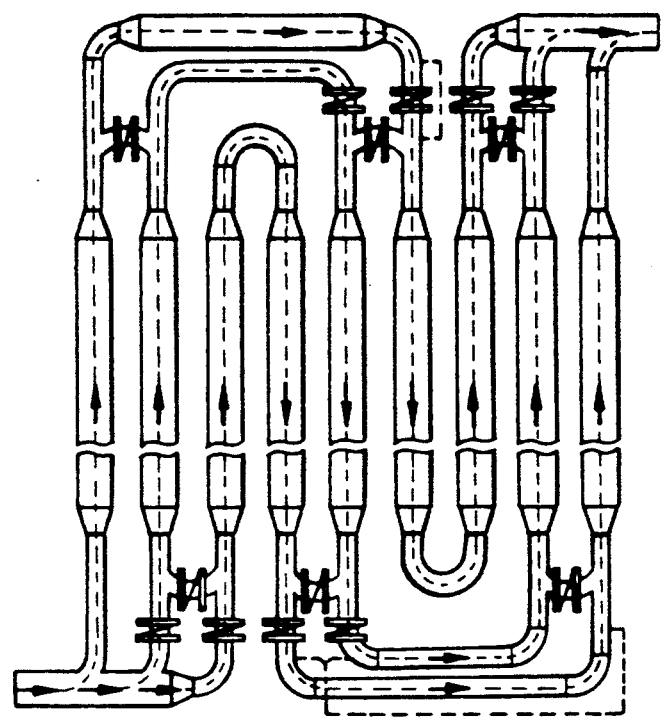
Figure 6:
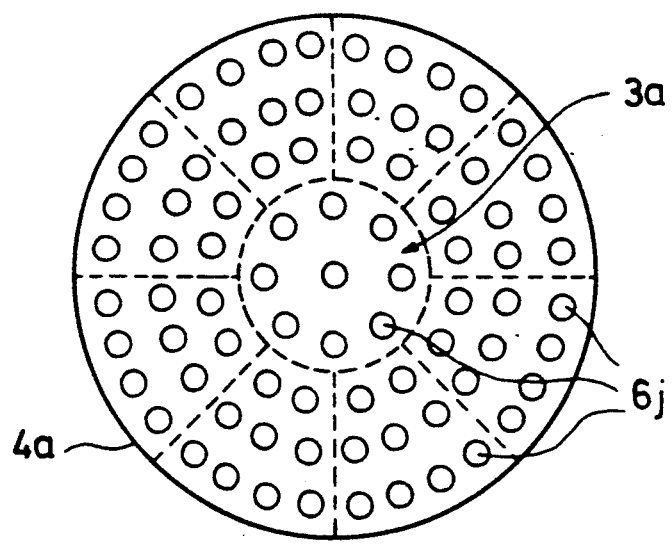

Embodiments of the invention shall now be described by way of example with reference to the accompanying drawings, wherein:

FIG. 1 shows a diagrammatic sideview of a wort boiler apparatus with an external heat exchanger, FIG. 2 shows a diagrammatic sideview of a heat exchanger according to the invention, FIG. 3 shows a sectional view of the heat exchanger taken along the line A—A in FIG. 2, FIG. 4 shows a developed view of a heat exchange section according to the invention in a state defining a wort flow path of a first length, FIG. 5 shows the heat exchange section of FIG. 4 in a state defining a wort flowpath of a second length, and FIG. 6 shows a sectional view similar to FIG. 3 of a second embodiment of the heat exchanger according to the invention.

In FIG. 1, reference numeral 1 designates a wort boiler vessel connected to an external heater circuit 8 comprising a heat exchanger 2, a pump 10, and valves 9 and 10. Heat exchanger 2 has an inlet 12 for the supply of a heating medium such as steam or hot water to the heat exchanger, and an outlet 13 for draining the steam or condensate, or the hot water, respectively, from the heat exchanger. Indicated at 43 is a valve provided on wort boiler vessel 1 for permitting the escape from the boiler vessel of the steam generated during the wort boiling operation.

For the wort boiling operation, valve 11 is opened and pump 10 is operated for pumping the wort from boiler vessel 1 into heat exchanger 2, with valve 9 kept in the closed state during a pre-heating phase. At the end of the pre-heating phase, valve 9 is opened, so that the wort heated in heat exchanger 2 returns into boiler vessel 1 in a continuous flow. The steam released by the wort in a post-evaporation phase in boiler vessel 1 escapes therefrom through opened valve 43.

The heat exchanger shown diagrammatically in FIG. 1 is depicted in more detail in FIGS. 2 and 3. Reference numeral 3 designates a number of heat exchange sections each comprising nine heat exchanger pipes 6 disposed parallel to one another in a symmetrical circular cross-sectional arrangement.

Each heat exchange section 3 has an inlet 44 and an outlet 45 for the wort flow through the heat exchanger. Provided at the ends of each heat exchange section 3 are pipe connections and associated valves (not illustrated in FIGS. 2 and 3) operable to establish wort flowpaths of different lengths through the respective heat exchange section by the use of all of the heat exchanger pipes 6 included therein. All heat exchange sections 3 are surrounded by a common casing 4 forming the outer wall of heat exchanger 2. Casing 4 is provided with a circumferential crimp 14 for the compensation of different heat expansion. Casing 4 is further provided with a pipe connector 12a for the entry of steam used as a heating medium, and a pipe connector 13a for the escape of the heating steam or heating steam condensate, respectively.

The manner in which the heat exchanger pipes of a heat exchange section are interconnected at their respective ends is shown in FIG. 4, this figure illustrating a developed view of a heat exchange section, in which the heat exchanger pipes 6a to 6i of the section are depicted in a side-by-side arrangement. A connecting pipe 50 has a wort inlet end 44a and is provided with a number of branch pipes 51 to 53 each connected to one end of heat exchanger pipes 6a to 6c, respectively. Branch pipes 52 and 53 are each provided with a respective valve 15 and 17, and interconnected by a further connecting pipe 54 provided with another valve 16. The respective other ends of heat exchanger pipes 6a to 6c are connected to heat exchanger pipes 6f, 6e and 6d, respectively, via connecting pipes 64, 65 and 69. Provided between connecting pipes 64 and 65 are cross connection pipes 68 and 71 with valves 22 and 24, respectively, installed therein. At locations between cross-connection pipes 68 and 71, each connecting pipe 64 and 65 is provided with a valve 25 and 23, respectively. At their ends opposite connecting pipes 64, 65 and 69, heat exchanger pipes 6d to 6f are connected to heat exchanger pipes 6i, 6h and 6g, respectively, via further connecting pipes 60, 58 and 59. Connecting pipes 58 and 60 are again interconnected by cross-connection pipes 56 and 62 each provided with a valve 19 and 21, respectively. At their ends opposite connecting pipes 58, 59 and 60, heat exchanger pipes 6g to 6i are connected to branch pipes 73, 76 and 77, respectively, of a main connecting pipe 74 having a wort outlet end 45a. Pipes 73 and 76 are each provided with a valve 26 and 28, respectively, and interconnected upstream thereof by a cross-connection pipe 75 including a valve 27. Reference numeral 46 designates a bypass connection bridging valve 25. Connecting pipe 60 is provided with a further bypass connection 47, 48 connecting it to connecting pipe 58.

In the state illustrated in FIG. 4, valves 16, 19, 21, 22, 24 and 27 are open, while valves 15, 17, 18, 20, 23, 25, 26 and 28 are closed. In this manner heat exchanger pipes 6a to 6i are interconnected in series to thereby define a first wort flowpath of a length approximately corresponding to nine times the length of an individual heat exchanger pipe (the length of the connecting pipes being practically negligible in view of the length of the heat exchanger pipes themselves). Bypass connections 47, 48 and 46, respectively, are provided for preventing from wort becoming stagnant in connecting pipes 60, 58 and 64 upstream of closed valves 18, 20 and 25. To this purpose, bypass connections 47, 48 and 46 have a reduced flow section sufficient for draining the wort from the shut-down connecting pipes.

The construction illustrated in FIG. 5 is identical to that shown in FIG. 4, so that the designation of the components by reference numerals could be omitted. In the state shown in FIG. 5, valves 16, 19, 21, 22, 24 and 27 are closed, while the remainder of the valves is open. In this manner heat exchanger pipes 6a to 6c, 6d to 6f and 6g to 6i, respectively, are connected in parallel, the thus formed parallel-connected groups being connected in series to one another. In this state, the wort flowpath is only about three times the length of an individual heat exchanger pipe.

Assuming a constant flow rate, the time during which the wort is subjected to heating in the state shown in FIG. 4 is about three times as long as the heating time in the state illustrated in FIG. 5. The state shown in FIG. 4 correspondingly results in that a greater amount of material is evaporated than in the state according to FIG. 5. This permits the apparatus to be employed in brewing different types of beer requiring different evaporation values.

In the embodiment of a heat exchanger shown in FIG. 6, a heat exchange section of a construction corresponding to the above described embodiment is disposed at the center of the heat exchanger as indicated at 3a. The remainder of the volume defined by the casing 4a is occupied by another eight heat exchange sections each composed of nine heat exchanger pipes 6j in a sector-shaped arrangement.

· The number of heat exchange sections and the number of heat exchanger pipes in each section need not necessarily be nine as in the embodiments shown by way of example, nor need the two numbers be the same.

We claim:

1. A wort boiler apparatus comprising a wort boiler (1) and at least one separate heater circuit including a heat exchanger (2) for heating or/and boiling the wort, said heat exchanger (2) comprising a group of heat exchanger pipes for the passage of the wort through the heat exchanger, characterized in that said heat exchanger comprises at least one heat exchange section (3) composed of a plurality of heat exchanger pipes and having a wort inlet and a wort outlet, said heat exchange section (3) being provided with pipe connections and valves arranged to permit the wort to flow through said heat exchange section along flow paths of different length, each said flowpath including all of said heat exchanger pipes.

2. Apparatus according to claim 1, characterized in that said heat exchanger pipes are adapted to be interconnected in series and/or in parallel for the formation of flow paths of different lengths.

3. Apparatus according to claim 1 or 2, characterized in that each heat exchange section includes nine heat exchanger pipes.

4. Apparatus according to claim 3, characterized in that said heat exchanger pipes of said heat exchange section are adapted to be interconnected in series for the formation of a wort flow path of a first length, and in a series connection of groups of three pipes each for the formation of a wort flow path of a second length.

5. Apparatus according to claim 1 or 2, characterized in that all of said heat exchange sections (3) are enclosed in a common outer casing forming the outer wall of said heat exchanger for the passage therethrough of steam used as a heater medium.

6. Apparatus according to claim 1 or 2, characterized in that bypass pipings of reduced cross-sectional area are provided for the drainage of pipe branches shut down by the closure of respective valves.

* * * * *